March 26, 1940.  J. L. SCOTT  2,194,617
LAWN MOWER
Filed June 14, 1939  2 Sheets-Sheet 1
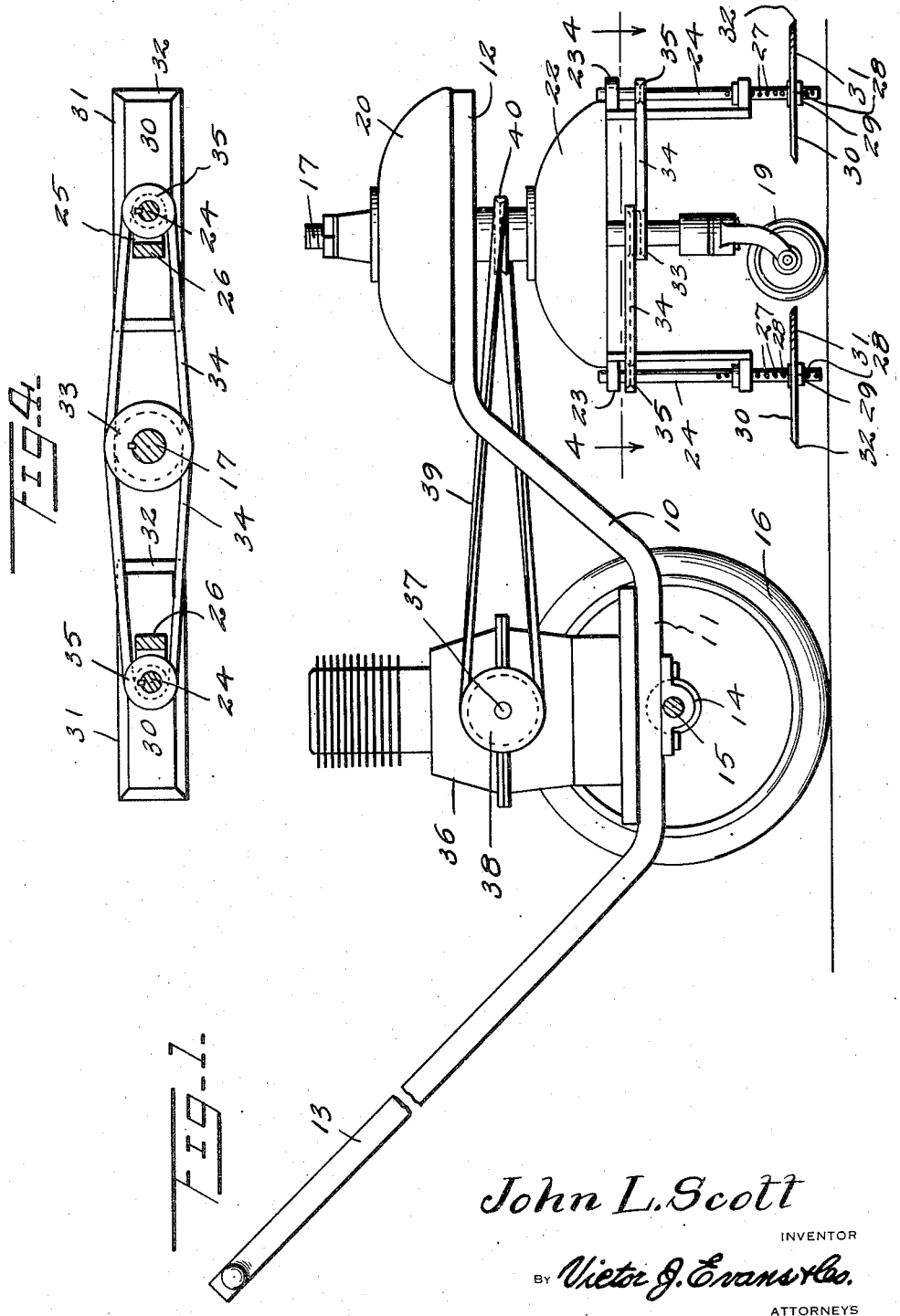
John L. Scott
INVENTOR
BY Victor J. Evans & Co.
ATTORNEYS March 26, 1940. J. L. SCOTT 2,194,617
LAWN MOWER
Filed June 14, 1939 2 Sheets-Sheet 2
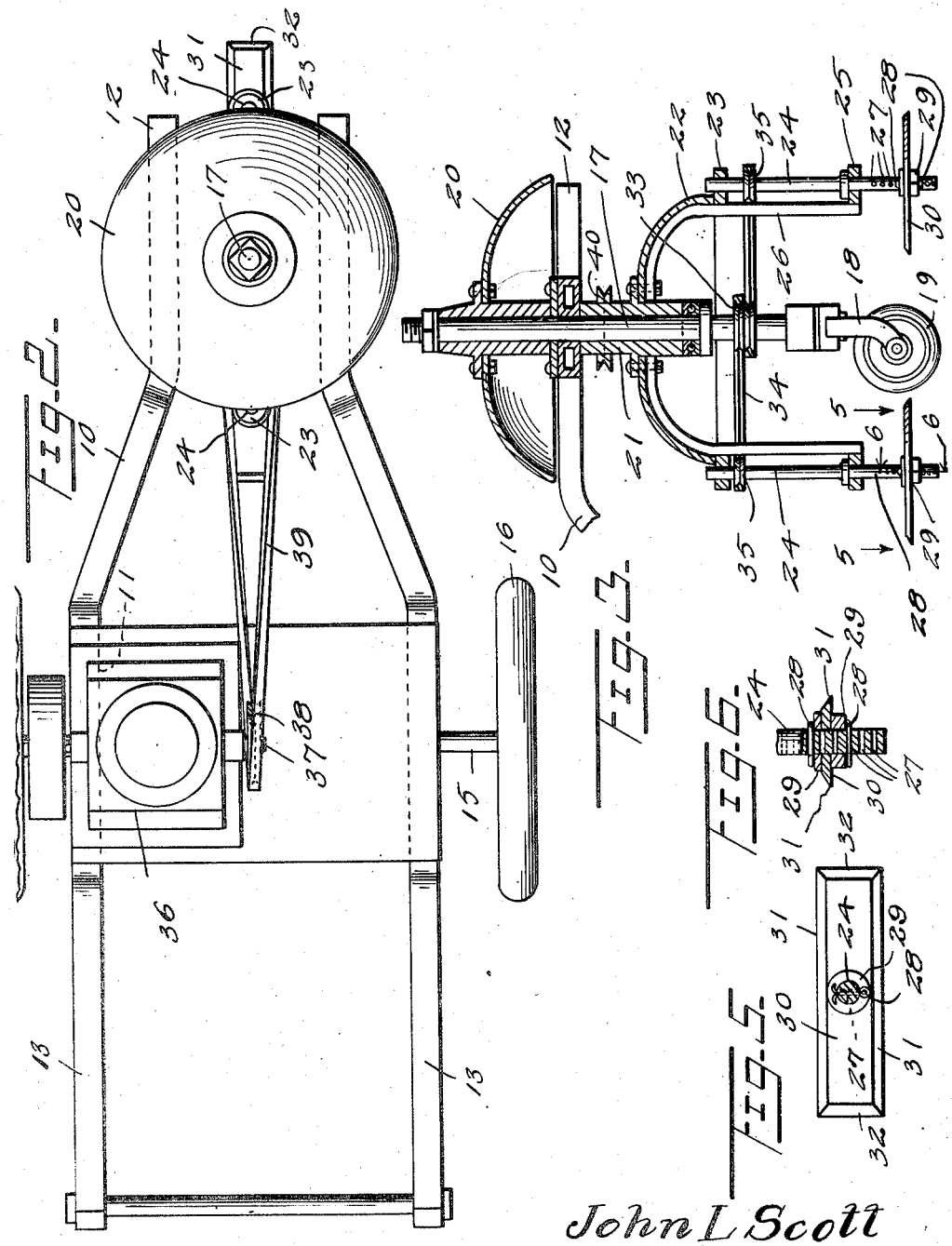
John L Scott
INVENTOR
BY Victor J.Evans&Co.
ATTORNEYS Patented Mar. 26, 1940

2,194,617

UNITED STATES PATENT OFFICE 2,194,617

LAWN MOWER

John L. Scott, Marion, Kans.

Application June 14, 1939, Serial No. 279,204

1 Claim. (Cl. 56—25)

The invention relates to a lawn mower and more especially to a rotary lawn mower.

The primary object of the invention is the provision of a lawn mower of this character wherein the blades travel in a circular path and rotate in a horizontal plane, the blades being susceptible of vertical adjustment for regulating the height of cutting action thereof in the working of the lawn mower and in the operation of the latter the grass will be evenly cut in an expeditious manner.

Another object of the invention is the provision of a lawn mower of this character wherein a plurality of rotatable blades operating in a horizontal plane will be driven from a common source, namely, a power unit carried upon the frame of such mower and in the operation of the said blades when striking a rigid object such as a tree root, rock, or the like, the striking blades can ride over the same without resultant damage thereto in that such blades will recede from advanced position for the clearing of such object.

A further object of the invention is the provision of a mower of this character wherein the chassis frame is equipped with three wheels, one being a caster wheel, the remaining two wheels being disposed at opposite sides of the chassis frame and are the main traction wheels of said mower, the latter being advanced by hand.

A still further object of the invention is the provision of a mower of this character which is simple in its construction, thoroughly reliable and efficient in operation, assuring a wide cutting spread, compact, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention and pointed out in the claims hereunto appended.

In the accompanying drawings:

Figure 1 is a side elevation of a lawn mower constructed in accordance with the invention.

Figure 2 is a top plan view thereof.

Figure 3 is a fragmentary vertical longitudinal sectional view through the mower.

Figure 4 is a sectional view taken on the line 4—4 of Figure 1 looking in the direction of the arrows.

Figure 5 is a sectional view on the line 5—5 of Figure 3 looking in the direction of the arrows.

Figure 6 is a detail sectional view taken on the line 6—6 of Figure 3 looking in the direction of the arrows.

Similar reference characters indicate corresponding parts throughout the several views in the drawings.

Referring to the drawings in detail, A designates generally the lawn mower constructed in accordance with the invention and involves a chassis frame 10, being underslung at 11 intermediate of its length in that the frame is of elongated formation having a contracted fore end 12 and the rear end creates a forwardly inclined handle 13. At the underslung portion 11 in suitable bearings 14 fixed thereto is a transverse axle 15 carrying main traction wheels 16, these being disposed at opposite sides of the chassis frame 10. Built in the end 12 of the chassis frame 10 is a vertical stationary shaft 17 which extends above and below the said end 12 and swivelled on the lower end of this shaft is a caster wheel fork 18 having journaled therein the wheel 19. The upper end of the shaft 17 wears a dome-like circular head 20 and this shaft 17 is centered with respect to the contracted end 12 of said chassis frame 10.

Rotatably fitting the shaft 17 is a hub 21 of an upwardly arched turning crown or carrier 22 being of dome-like characteristic similar to the head 20. At diametrically opposite points of the carrier 22 are laterally directed bearings 23 in which are journaled the upper end portions of rotatable cutter stems 24, these being also journaled in lower bearings 25 of hangers 26 fixed within the carrier 22. These stems 24 are vertically disposed with respect to a foundation travelled by the mower. The stems 24 at the lower portions thereof are provided with transverse holes 27 for cotter pins 28 which play against the washers 29 arranged at opposite sides of each cutter 30 in the form of elongated blades. This blade 30 is of substantially rectangular shape and has bevelled side and end cutting edges 31 and 32, respectively. The use of the cotter pins 28 which are engaged in the holes 27 in the stems 24 enables the vertical adjustment of the cutters on these stems and thereby regulating the height of the blades from the ground. The mower is advanced by hand for the cutting of grass.

Fixed to the shaft 17 are twin pulleys 33 over which are trained belts 34, these being also trained over pulleys 35 fixed to the stems 24 so that when the carrier 22 revolves about the shaft 17 rotary motion will be imparted to the stems 24 for the turning of the blades 30 on the swinging thereof in a circular path.

Suitably mounted upon the frame 10 at the underslung portion 11 thereof is a power unit 36 preferably an internal combustion motor, its driving shaft 37 carrying a pulley 38 over which is trained an endless belt 39, the latter being also trained over a belt pulley 40 fixed to the hub 21 of the carrier 22. The power unit drives the carrier 22 for its rotation and the carrier upon rotation thereof drives the stems 24 of the cutting blades 30.

In the revolving of the carrier 22 the cutters operate in a circular path and in their rotation cut the growing grass.

The swivelled caster wheel 19 in its advanced relation to the traction wheels 16 assures of easy guiding of the lawn mower on advancement thereof and the adjustability of the cutters enables the grass to be cut either close or relatively long in conformity with the height of adjustment of the said cutters.

What is claimed is:

A mowing machine comprising a chassis frame, having a contracted forward end and a rear handle end, a power unit on said frame between said ends, traction wheels for said frame, a stationary shaft vertically arranged at the contracted end of said frame, a head associated with said shaft and held fixed on the contracted end of the frame, a rotatable carrier fitting said shaft below said head, connections between the carrier and the power unit for the rotation of said carrier, a plurality of cutter stems rotatably mounted on the carrier, cutters on said stems and turnable in a horizontal plane, pulleys fixed to said shaft, pulleys fixed to the stems, and a belt engaged with the pulleys on the shaft and stems.

JOHN L. SCOTT.